(12) United States Patent
Tanaka et al.

(10) Patent No.: US 12,065,169 B2
(45) Date of Patent: Aug. 20, 2024

(54) VEHICLE CONTROL DEVICE

(71) Applicant: Hitachi Astemo, Ltd., Hitachinaka (JP)

(72) Inventors: Yuki Tanaka, Tokyo (JP); Tatsuya Horiguchi, Tokyo (JP); Teppei Hirotsu, Tokyo (JP); Hideyuki Sakamoto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 635 days.

(21) Appl. No.: 17/295,362

(22) PCT Filed: Nov. 27, 2019

(86) PCT No.: PCT/JP2019/046272
§ 371 (c)(1),
(2) Date: May 19, 2021

(87) PCT Pub. No.: WO2020/116262
PCT Pub. Date: Jun. 11, 2020

(65) Prior Publication Data
US 2022/0017119 A1     Jan. 20, 2022

(30) Foreign Application Priority Data
Dec. 7, 2018 (JP) .................................. 2018-229519

(51) Int. Cl.
*B60W 60/00* (2020.01)
*B60W 50/12* (2012.01)
*G07C 5/08* (2006.01)

(52) U.S. Cl.
CPC ...... *B60W 60/00186* (2020.02); *B60W 50/12* (2013.01); *G07C 5/0816* (2013.01)

(58) Field of Classification Search
CPC .......... B60W 60/00186; B60W 50/12; B60W 2050/0031; B60W 50/0205;
(Continued)

(56) References Cited

U.S. PATENT DOCUMENTS 5,816,669 A * 10/1998 Hiwatashi .............. B62D 7/159
                                                    303/146
2019/0361449 A1    11/2019   Ueno

FOREIGN PATENT DOCUMENTS

JP       02-007200 A      1/1990
JP       09-109866 A      4/1997
(Continued)

OTHER PUBLICATIONS

English translation of Written Opinion of The International Searching Authority for WO2020116262, date retrieved from internet Jan. 8, 2024, retrieved from https://patentscope.wipo.int/search/en/detail.jsf?docId=WO2020116262 (Year: 2024).*

(Continued)

*Primary Examiner* — Calvin Cheung
(74) *Attorney, Agent, or Firm* — Volpe Koenig

(57) ABSTRACT

Provided is an automatic driving system based on a model predictive control, the automatic driving system where, in an event of a failure of an actuator, identification between a real vehicle and a vehicle model is simplified. Based on information regarding the failure of the actuator, the automatic driving system updates a spot in the vehicle model, the spot corresponding to the spot of failure detected, to a fixed value, and causes an actuator control device for the actuator, where the failure is detected, to fix a command value that is overwritten in accordance with a state of the actuator. With this configuration, the identification between the real vehicle and the vehicle model is simplified.

9 Claims, 8 Drawing Sheets

(58) Field of Classification Search
CPC .......... B60W 50/035; B60W 2050/022; G07C 5/0816; G06F 11/07
See application file for complete search history.

(56) References Cited

FOREIGN PATENT DOCUMENTS

| | | |
|---|---|---|
| JP | 10-076965 A | 3/1998 |
| JP | 2003-291692 A | 10/2003 |
| JP | 2012-121380 A | 6/2012 |
| JP | 2018-131042 A | 8/2018 |

OTHER PUBLICATIONS

JP-2003291692-A with English translation; Date Filed Mar. 29, 2002; Date Published Oct. 15, 2003. (Year: 2003).*
JP-2003291692-A with English translation; Date Filed Feb. 15, 2017; Date Published Aug. 23, 2018. (Year: 2018).*
JP-2012121380-A with English translation; Date Filed Dec. 6, 2010; Date Published Jun. 28, 2012. (Year: 2012).*
International Search Report, PCT/JP2019/046272, Mar. 17, 2020 (2 pgs.).

\* cited by examiner

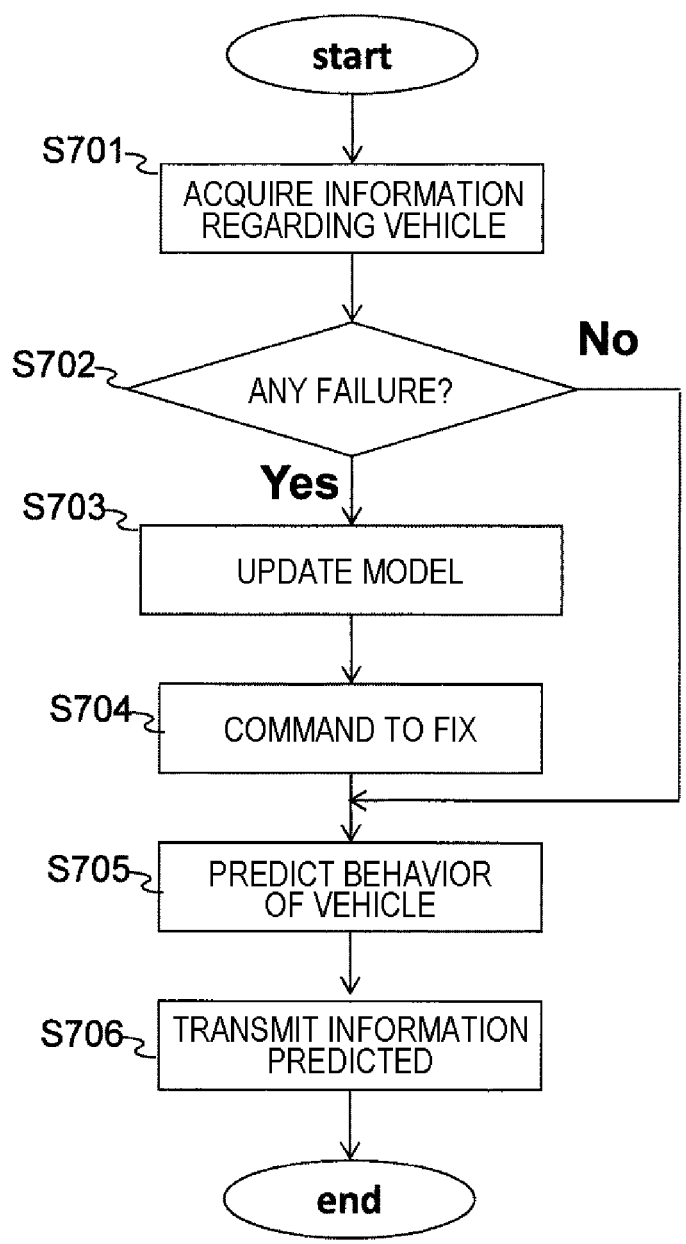

FIG. 8

| No | $B_0$ | $B_1$ | $B_2$ | $B_3$ | $P_0$ | ... | $S_0$ |
|---|---|---|---|---|---|---|---|
| 1 | 0% | Normal | Normal | Normal | Normal | ... | Normal |
| 2 | 50% | Normal | Normal | Normal | Normal | ... | Normal |
| 3 | 100% | Normal | Normal | Normal | Normal | ... | Normal |
| 4 | Normal | 0% | Normal | Normal | Normal | ... | Normal |
| 5 | Normal | 50% | Normal | Normal | Normal | ... | Normal |
| 6 | Normal | 100% | Normal | Normal | Normal | ... | Normal |
| 7 | Normal | Normal | 0% | Normal | Normal | ... | Normal |
| 8 | Normal | Normal | 50% | Normal | Normal | ... | Normal |
| 9 | Normal | Normal | 100% | Normal | Normal | ... | Normal |
| 10 | Normal | Normal | Normal | 0% | Normal | ... | Normal |
| 11 | Normal | Normal | Normal | 50% | Normal | ... | Normal |
| 12 | Normal | Normal | Normal | 100% | Normal | ... | Normal |
| ... | ... | ... | ... | ... | ... | ... | ... |

FIG. 9

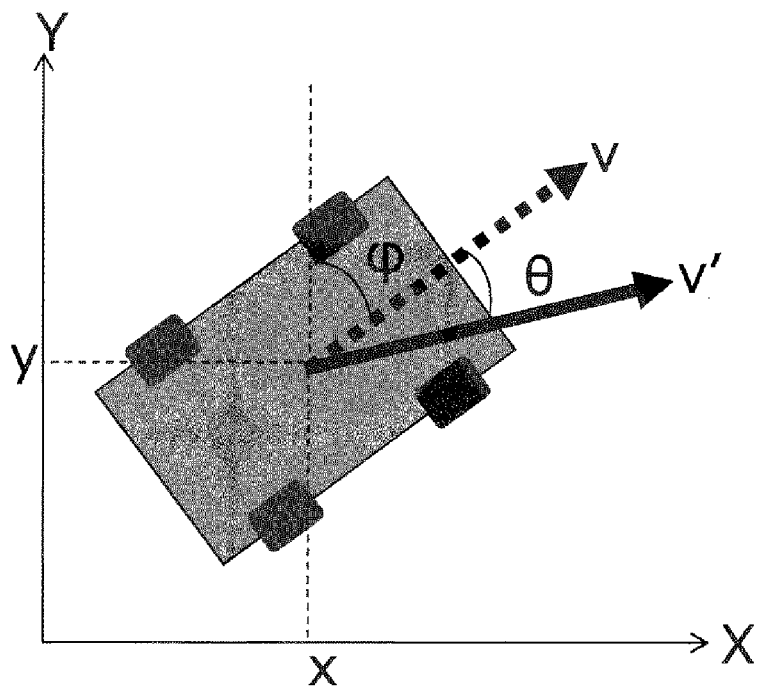

VEHICLE CONTROL DEVICE

TECHNICAL FIELD

The present invention relates to a vehicle control device, particularly to a fail-operational system in a control system.

BACKGROUND ART

As a background technology in this technical field, JP 2012-121380 A (PTL 1) is known. PTL 1 discloses: "An object of the present invention is to provide a system" configured, when any one of various devices for controlling a state of a vehicle fails, to stably maintain a behavior of the vehicle in a transitional process until an amount of controlling the state of the vehicle is restored to a neutral point, the amount corresponding to the one of various devices that fails; and in order to achieve the object, the system includes a control means configured to control a steering angle of a wheel that is in normal condition, the steering angle controlled in accordance with a returning amount of a steering angle of a wheel that is in failure, and to control a left and right braking-driving force difference."

CITATION LIST

Patent Literature

PTL 1: JP 2012-121380 A

SUMMARY OF INVENTION

Technical Problem

PTL 1 discloses a method configured, when the failure occurs in a variable means for wheel steering angle, to prevent the behavior of the vehicle from becoming unstable until the wheel that is in failure is returned to the neutral point.

However, in an automatic driving system in model-based control, a gap occurs between the vehicle (a real vehicle) that is in failure and a vehicle model. Here, the state of the real vehicle in failure needs to be reflected on the vehicle model. This requirement is referred to as a system identification, which is a complicated problem, and it is thus difficult to fulfill the requirement in real-time on a low-priced electronic control unit (ECU). Accordingly, the system identification needs to be simplified such that, in an event of the failure, the identification between the real vehicle that is in failure and the vehicle model is ensured.

In view of the respects described above, the present invention provides means where a vehicle control device improves control stability.

Solution to Problem

In order to achieve the object described above, an aspect of the present invention only has to provide a technical concept defined by the appended claims. Specifically, based on information regarding a failure, the vehicle control device updates a spot in the vehicle model, the spot corresponding a spot of the failure detected, to a fixed value, and causes an actuator control device for the actuator, where the failure is detected, to fix a command value that is overwritten in accordance with a state of the actuator. With this configuration, it is possible to match the behavior of the real vehicle with the behavior of the vehicle model; and thus, it is possible to achieve the object described above.

Advantageous Effects of Invention

According to the present invention, failure patterns of a vehicle is reduced, so that system identification between a real vehicle that is in failure and a vehicle model can be simplified. With this configuration, it is possible to update the vehicle model on a low-priced ECU and thus possible to continue to travel.

BRIEF DESCRIPTION OF DRAWINGS

FIG. 7 shows a flow operated by a model control unit.

FIG. 8 is a table showing an example of patterns of a vehicle model.

FIG. 9 illustrates an example of an image of the vehicle model.

DESCRIPTION OF EMBODIMENTS

An example of a preferred embodiment (embodiment) of the present invention will be described below. This embodiment mainly describes a vehicle control system and a vehicle control device, each included in a vehicle system. Thus, this embodiment is preferably used for the vehicle system, but is not limited thereto. This embodiment may be applied to other systems in addition to the vehicle system.

First Embodiment

<Configuration of Vehicle System>

Figure 2:
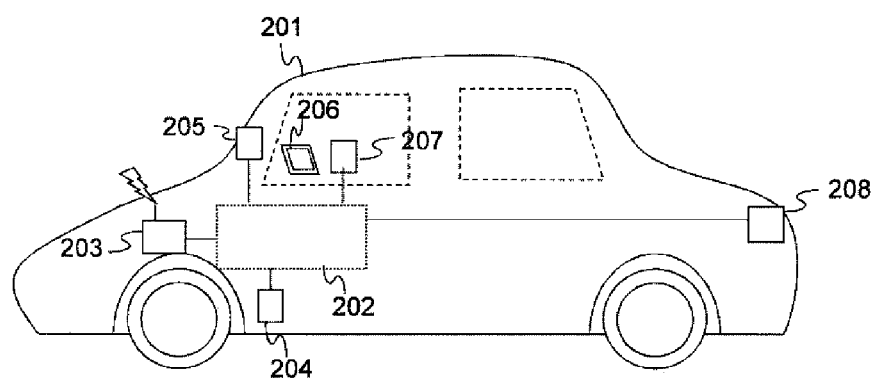
FIG. 2 is an example of a configuration of a vehicle system.

FIG. 2 is a schematic diagram of a vehicle system according to this embodiment, and a vehicle control device is included in the vehicle system. A vehicle system 201, such as an automobile, includes the vehicle control device therein. The vehicle system 201 includes an automatic driving electronic control unit (ECU) (a vehicle control device) 202, a wireless communication unit 203, a drive device (actuator) 204, a recognition device 205, an output device 206, an input device 207, and a notification device 208. The automatic driving ECU (vehicle control device) 202 is configured to control a vehicle; the wireless communication unit 203 is configured to acquire information such as a map; the drive device (actuator) 204 is configured to control motion of the vehicle under control of the vehicle control device 202, for example, to drive an engine, a wheel, a brake pedal, a steering device, or the like; the recognition device 205 is, for example, a camera or a sensor, and is configured to acquire information inputted from a surrounding environment and output information for generating information to recognize the surrounding environment; the output device 206 is configured to display required information such as speed of the vehicle or warnings; the input device 207 is configured to receive an input of a command to operate the vehicle, such as a pedal command or a steering command; and the notification device 208 is, for example, a lamp, a light emitting diode (LED) device, or a speaker, and the vehicle system 201 causes the notification device 208 to notify the surrounding environment of a condition of the vehicle.

<Configuration of Automatic Driving ECU>

Figure 3:
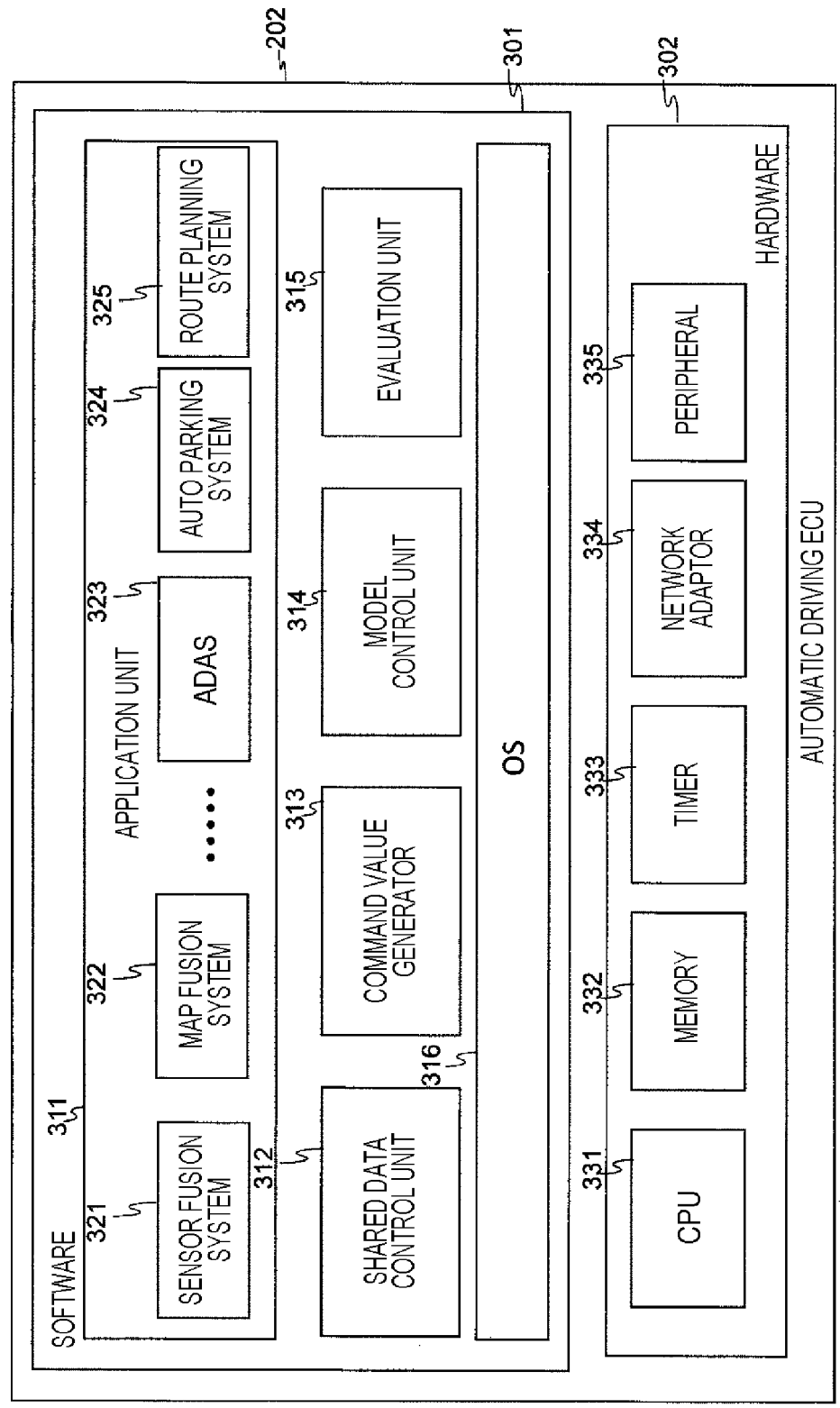
FIG. 3 is an example of a configuration of an automatic driving electronic control unit (ECU).

Various forms of technology to automatically drive automobiles are increasingly feasible. Many forms of the technology to automatically drive automobiles are feasible by use of a computer control device. FIG. 3 is a block diagram of the automatic driving ECU 202. The automatic driving ECU 202 includes an application unit 311 that includes a sensor fusion system 321, a map fusion system 322, an advanced driving assistant system (ADAS) 323, an auto parking system 324, and a route planning system 325. The sensor fusion system 321 is configured to process information regarding the surrounding environment, the information received from a peripheral, such as a sensor device; the map fusion system 322 is configured to process the map information for automatic driving; the ADAS 323 is configured to operate functions, such as operating an automatic brake to stop the vehicle immediately before colliding with another vehicle, following a preceding vehicle at a constant distance from the preceding vehicle, and controlling the steering such that the vehicle stays in lane; the auto parking system 324 is configured to automatically park the vehicle; and the route planning system 325 is configured to generate a route for the automatic driving. The application unit 311 uses data that is processed and controlled in an integrated manner in a shared data control unit 312. With this configuration, a function to control data for each application may be omitted, thereby resulting in a high-speed response required for controlling the vehicle in the automatic driving.

In a model predictive control used for the automatic driving, a command value generator 313 generates an operational command value; based on the operational command value, a model control unit 314 predicts a behavior of the vehicle; and based on a result predicted, an evaluation unit 315 evaluates the operational command value.

Here, an embedded OS 316 is used as an operating system. A hardware 302 includes a CPU 331, a memory 332, a timer 333, a network adaptor 334, and a peripheral 335. The timer 333 is configured to provide timing for real-time control; the network adaptor 334 is configured to access the network; and the peripheral 335 is, for example, the sensor for monitoring the surrounding environment or the automatic brake.

<Model Predictive Control>

The model predictive control is a control method based on a behavior model to be controlled. Here, a model modeling the behavior of the vehicle to be controlled is created and held. Then the model (behavior model) is used to predict the behavior of the vehicle with respect to an operation of each of the actuators. With this configuration, the operational command value optimized for driving as planned is searched.

Figure 4:
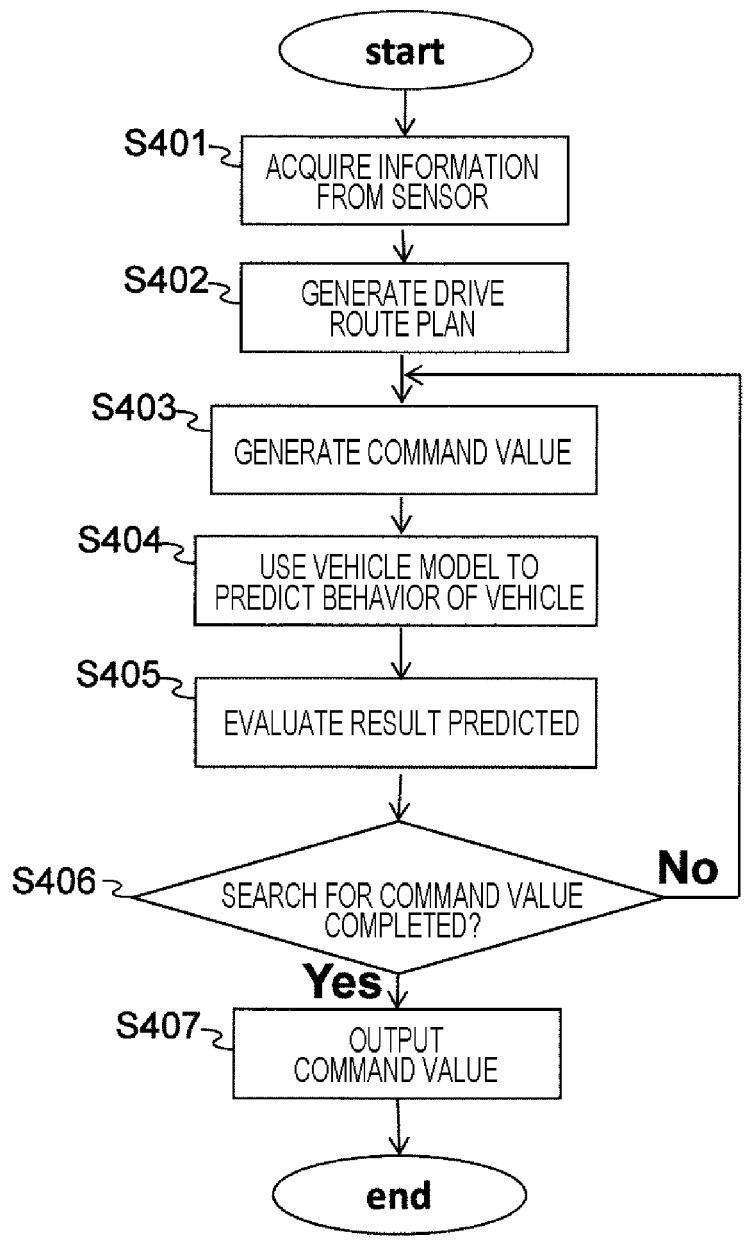
FIG. 4 shows an example of a flow of a model predictive control operated by the automatic driving ECU.

FIG. 4 shows a flow of the model predictive control. The automatic driving ECU 202 acquires, from the sensor, the information regarding the surrounding environment and information regarding a position of the vehicle (S401). Based on the information acquired, the automatic driving ECU 202 generates a drive route plan for the vehicle (S402). Subsequently, the automatic driving ECU 202 generates a candidate operational command value for operating each of the actuators 204 (S403), and uses a vehicle model to predict the behavior of the vehicle based on the operational command value generated (S404). The automatic driving ECU 202 evaluates the result predicted, and when the result predicted is good, the candidate operational command value is updated (S405). These process steps are repeated until the search for the operational command value is completed (No in S406). When having completed predicting the behavior of the vehicle (Yes in S406), the automatic driving ECU 202 outputs the operational command value determined as best. In order to determine whether or not to complete searching for the operational command value, the automatic driving ECU 202 also refers to the number of times of generation of the candidate operational command values, a period of time for searching the operational command value, an amount of fluctuation in the values evaluated, the number of the values evaluated and determined as not good, or the like.

<Vehicle Model>

An example of the vehicle model will be described with reference to FIG. 9. In FIG. 9, each of x and y represents a coordinate of the vehicle; φ represents an orientation of the vehicle, v represents the speed of the vehicle; θ represents angular speed; and v' represents a traveling vector when v is refracted by θ. When L represents a total length of the vehicle, Δt represents a distance of a single step, t represents the number of steps, and a represents acceleration of the vehicle, the position, the orientation and the speed of the vehicle after traveling the single step are expressed by equations below.

$$x_{t+1} = x_t + v_t \Delta t \cos\theta \sin\varphi - v_t \Delta t \sin\theta \sin(\varphi+90°) - (\tfrac{1}{2}) a\Delta t^2 \cos\theta \sin\varphi - (\tfrac{1}{2}) a\Delta t^2 \sin\theta \sin(\varphi+90°) - (v t^2/L)\Delta t \sin\theta \sin(\varphi+90°) - (a^2/2l)\Delta t^2 \sin\theta \sin(\varphi+90°) \quad (1)$$

$$y_{t+1} = y_t + v_t \Delta t \cos\theta \cos\varphi - v_t \Delta t \sin\theta \cos(\varphi+90°) - (\tfrac{1}{2}) a\Delta t^2 \cos\theta \cos\varphi - (\tfrac{1}{2}) a\Delta t^2 \sin\theta \cos(\varphi+90°) - (v t^2/L)\Delta t \sin\theta \cos(\varphi+90°) - (a^2/2l)\Delta t^2 \sin\theta \cos(\varphi+90°) \quad (2)$$

$$v_{t+1} = v_t + a\Delta t \quad (3)$$

$$\varphi_{t+1} = \varphi_t + (v_t/L)\Delta t \sin\theta + (a/L)\Delta t^2 \sin\theta \cos\varphi \quad (4)$$

<Vehicle Control System>

Figure 1:
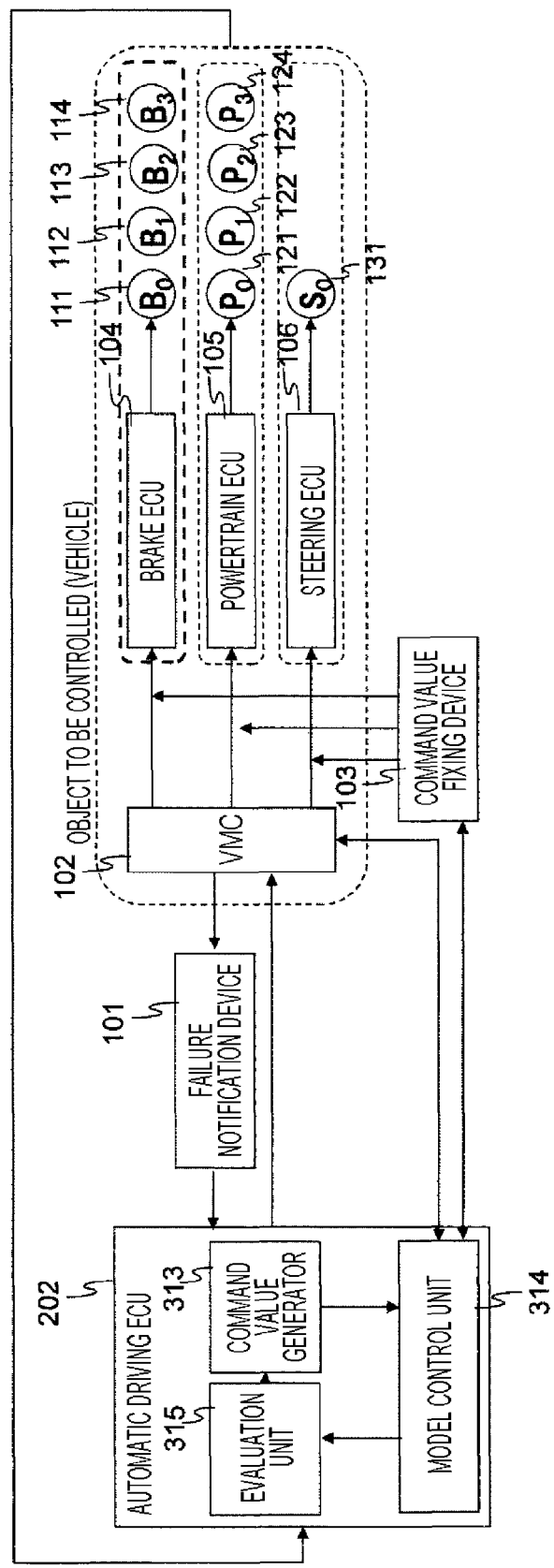
FIG. 1 is an example of a configuration of a vehicle control system.

An example of a configuration of a vehicle control system will be described with reference to FIG. 1, the vehicle control system configured to operate a fail-operational system when any one of the actuators fails. A vehicle motion controller (VMC) 102 acquires the operational command value that the automatic driving ECU 202 has generated based on the model predictive. Then, the VMC 102 converts the operational command value into a control command value for controlling each of the actuators. Each of actuator ECUs 104, 105, and 106 receives the control command value and controls the corresponding actuator(s) 111 to 114, 121 to 124, and 131.

When any one of the actuators fails, a failure notification device 101 transmits failure information to the automatic driving ECU. Based on the failure information, the automatic driving ECU 202 updates the model control unit 314; and based on the model updated, a command value fixing device 103 fixes the control command value for the corresponding actuator.

<VMC (Vehicle Motion Controller)>

Figure 5:
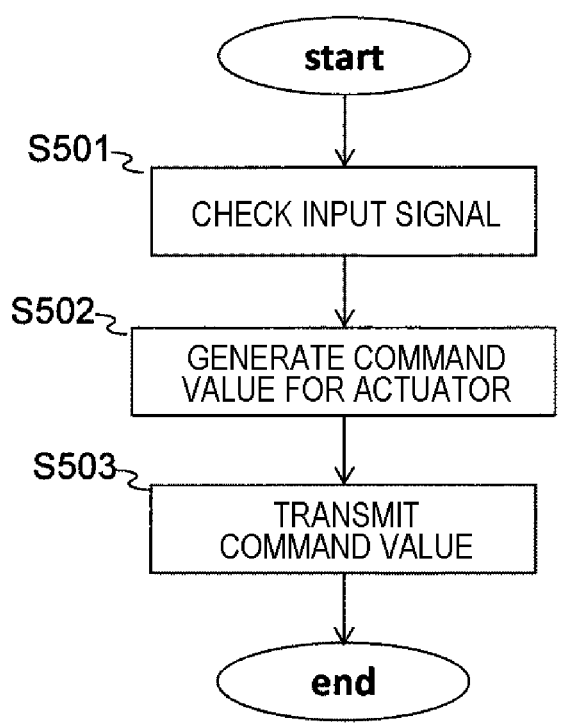
FIG. 5 shows an example of a flow operated by a vehicle motion controller (VMC).

An example of a flow operated by the VMC 102 will be described with reference to FIG. 5. The VMC 102 checks the operational command value received from the automatic driving ECU 202, and checks whether or not the operational command value is a valid signal and is feasible for the vehicle in the current condition, such as the conditions of the actuators (S501). Subsequently, the VMC 102 generates the control command value for each of the actuators 111, 112, 113, 114, 121, 122, 123, 124, and 131 to satisfy the operational command value (S502). The control command value generated is transmitted to each of the actuator ECUs 104, 105 and 106 (S503). Based on the control command value, each of the actuator ECUs 104, 105, and 106 controls the corresponding actuator(s) 111 to 114, 121 to 124, and 131.

<Failure Notification Device>

Figure 6:
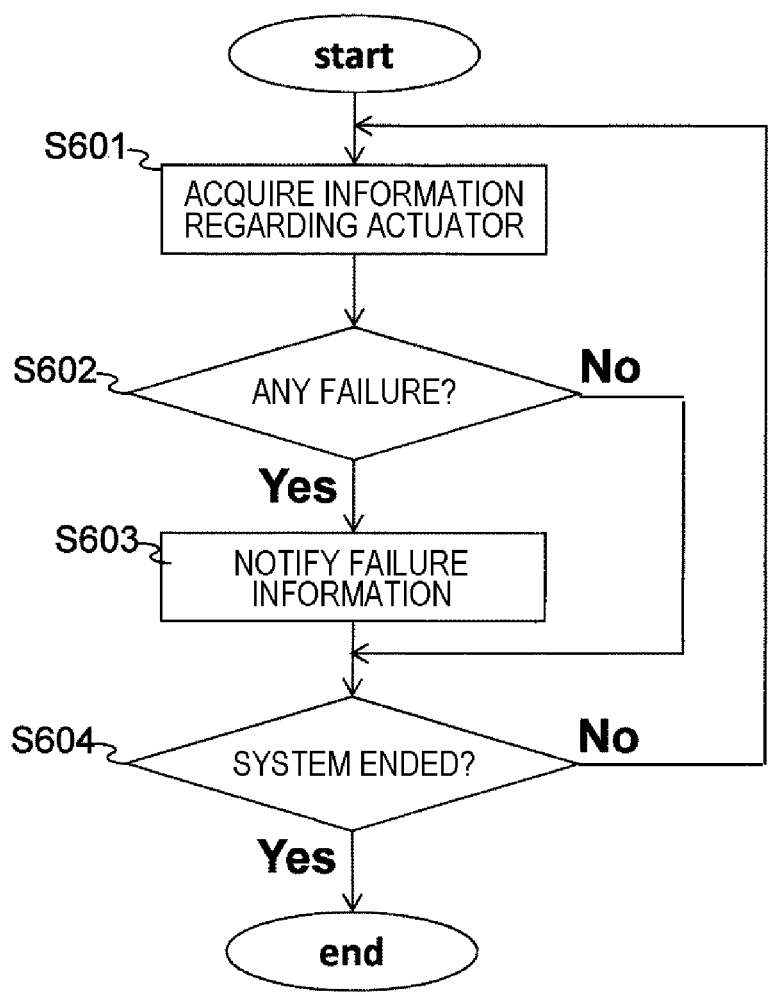
FIG. 6 shows an example of a flow operated by a failure notification device.

When any one of the actuators 111, 112, 113, 114, 121, 122, 123, 124, and 131 fails, the failure notification device 101 notifies the automatic driving ECU 202 of status of the failure. FIG. 6 shows an example of a flow operated by the failure notification device 101. The failure notification device 101 acquires information from the sensor monitoring a state of each of the actuators (S601), and determines whether or not the corresponding actuator fails (S602). When any one of the actuators 111, 112, 113, 114, 121, 122, 123, 124, and 131 fails (Yes in S602), the failure notification device 101 notifies the automatic driving ECU of the failure information (S603). When none of the actuators fails (No in S602), monitoring continues until the system is ended (No in S604).

<Model Control Unit>

An example of a flow operated by the model control unit 314 in the model predictive control will be described with reference to FIG. 7. First, the model control unit 314 acquires information regarding the vehicle (S701), and determines whether or not any one of the actuators 111, 112, 113, 114, 121, 122, 123, 124, and 131 fails (S702). When none of the actuators fails (No in S702), the model control unit 314 uses the vehicle model to predict the behavior of the vehicle based on the candidate operational command value that the automatic driving ECU 202 has generated (S705). The behavior of the vehicle that the model control unit 314 has predicted is transmitted to the automatic driving ECU 202 (S706). When any one of the actuators 111, 112, 113, 114, 121, 122, 123, 124, and 131 fails (Yes in S702), the vehicle model is updated in accordance with the failure. The vehicle model is updated such that an output from the actuator in failure is fixed at zero. Subsequently, in accordance with the vehicle model updated, a shutdown command is transmitted to the actuator in failure (S703). Alternatively, with regard to the update of the vehicle model and the command for the actuator in failure, the corresponding actuator may fix a maximum value or may set a fixed value step by step in accordance with the status of the failure.

Still alternatively, when any other one of the actuators is capable of covering for the operation of the actuator in failure, the control command value for the actuator in failure may be held as the fixed value, and concurrently, the vehicle model may be updated such that any other one of the actuators continues the operation in place of the actuator in failure.

<Effect of Embodiment>

According to the embodiment described above, in the automatic driving system based on the model predictive control, when any one of the failures causes a gap to occur between the behavior of the vehicle and the behavior model (vehicle model), the control command value for the real vehicle is fixed, and the vehicle model is updated based on the control command value fixed. With this configuration, it is possible, when any one of the actuators fails, to simplify system identification between the real vehicle and the vehicle model without being required of any complicated operation. Accordingly, in this embodiment, when any one of the failures occurs, it is possible to match the real behavior of the vehicle with the behavior model (vehicle model) even on a low-priced ECU; and thus, it is possible to continue to travel in accordance with the vehicle model updated.

Second Embodiment

<Patterning of Vehicle Model>

A second embodiment according to the present invention will be described with reference to FIG. 8. Note that, a description of the same configurations as those in the first embodiment will be omitted as appropriate. In an example of this embodiment, when any one of the actuators fails, a pattern for updating the vehicle model is previously held. Based on a failure of each of the actuators presumed, a candidate pattern for updating the vehicle model is previously created and held. When each of the actuators fails, the model control unit 314 selects a pattern for updating the vehicle model, the pattern transitable and closest. Then, based on the pattern selected, the vehicle model is updated. In accordance with the vehicle model updated, the command value fixing device 103 overwrites the control command value for the corresponding actuator.

<Effect of Embodiment>

According to the embodiment described above, the patterns for updating the vehicle model are previously prepared. With this configuration, it is possible, when any one of the actuators fails, to simplify determination on the candidate pattern for updating the vehicle model; and thus, it is possible to reduce load for the system identification.

Third Embodiment

<Model Predictive Control Based on Control Command Value>

A third embodiment according to the present invention will be described. In an example of this embodiment, the control command value is used as a candidate command value for the model predictive control. Here, operations of the vehicle and performance of the actuators are used for the vehicle model. In addition to the equations (1) to (4) previously described, the acceleration a and the angular speed θ are obtained based on an operational amount of each of the actuators. When each of Pfr, Pfl, Prr, and Prl represents an operational amount of the corresponding powertrain wheel, each of Bfr, Bfl, Brr, and Brl represents an operational amount of the corresponding brake wheel, and S represents an operational amount of the steering, the acceleration a and the angular speed θ are expressed by equations below.

$$a=(P_{fr}\_B_{fr})+(P_{fl}\_B_{fl})+(P_{rr}\_Brr)+(P_{rl}\_B_{rl}) \qquad (5)$$

$$\theta=S+((P_{fr}\_B_{fr})-(P_{fl}\_B_{fl})+(P_{rr}\_B_{rr})-(P_{rl}\_B_{rl})) \qquad (6)$$

The automatic driving ECU 202 generates a candidate control command value for each of the actuators, and predicts the behavior of the vehicle based on the vehicle model. The VMC 102 acquires a control command value determined, confirms whether or not the control command value determined is feasible for each of the actuators 111 to 114, 121 to 124, and 131, and transmits the control command value determined to the corresponding actuator ECU 104, 105, and 106.

<Effect of Embodiment>

According to the embodiment described above, the control command value for each of the actuators is used to the search for the model predictive control. With this configuration, it is possible to continue to travel in a more stable manner.

REFERENCE SIGNS LIST 101 failure notification device
102 VMC
103 command value fixing device
104 brake ECU
105 powertrain ECU
106 steering ECU
111 front right brake
112 front left brake
113 rear right brake
114 rear left brake
121 front right powertrain
122 front left powertrain
123 rear right powertrain
124 rear left powertrain
131 steering
201 vehicle system
202 automatic driving ECU
203 wireless communication unit
204 drive device
205 recognition device
206 output device
207 input device
301 software
302 hardware
311 application unit
312 shared data control unit
313 command value generator
314 model control unit
315 evaluation unit
316 OS
321 sensor fusion system
322 map fusion system
323 ADAS
324 auto parking system
325 route planning system
331 CPU
332 memory
333 timer
334 network adaptor
335 peripheral

The invention claimed is:

1. A vehicle control system that improves control stability of a vehicle, the vehicle control system comprising:
actuators formed as a group, each of the actuators included in the vehicle; and
actuator control devices formed as a group, each of the actuator control devices configured to control a corresponding one of the actuators;
one or more Electronic Control Units (ECUs) that are communicatively coupled to the actuator control devices, wherein the one or more ECUs are collectively configured to:
control the actuator control devices based on a behavior model for the vehicle,
detect a failure in a component of the vehicle control system while the vehicle is in operation, wherein the component is one or more of the actuators and/or each of the actuator control devices,
in response to the failure detected, update the behavior model for the vehicle based on the failure detected to form an updated model for the vehicle, wherein the updated model sets a value for the component to a fixed value; and
control the actuator control devices based on the updated behavior model for the vehicle.

2. The vehicle control system according to claim 1, wherein the actuators include a deceleration device.

3. The vehicle control system according to claim 1, wherein the actuators include a steering angle control device.

4. The vehicle control system according to claim 1, wherein the actuators include a drive device controlled.

5. The vehicle control system according to claim 1, wherein the one or more ECUs are further collectively configured to detect a spot of the failure and a state of the failure.

6. The vehicle control system according to claim 1, wherein the fixed value corresponds to a pause state of the component.

7. The vehicle control system according to claim 1, wherein the fixed value corresponds to an initial value of the component.

8. The vehicle control system according to claim 1, wherein when the one or more ECUs are further collectively configured to:
notify a service workshop and/or a driver of the failure.

9. The vehicle control system according to claim 1, wherein the updated model causes an operational amount of the component to be fulfilled by any other one of the actuators.

* * * * *